(12) United States Patent
Duale et al.

(10) Patent No.: US 12,614,440 B2
(45) Date of Patent: Apr. 28, 2026

(54) AUTOMATED EMERGENCY DETERMINATION AND RESPONSE

(71) Applicant: INTERNATIONAL BUSINESS MACHINES CORPORATION, Armonk, NY (US)

(72) Inventors: Ali Y. Duale, Poughkeepsie, NY (US); Akil Khamisi Sutton, Poughkeepsie, NY (US); Edward C. McCain, Campbell Hall, NY (US); Kennedy Cheruiyot, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/500,304

(22) Filed: Nov. 2, 2023

(65) Prior Publication Data

US 2025/0148893 A1 May 8, 2025

(51) Int. Cl.

| | |
|---|---|
| ***G08B 21/04*** | (2006.01) |
| ***G08B 25/01*** | (2006.01) |
| ***G08B 29/18*** | (2006.01) |

(52) U.S. Cl.
CPC ..... *G08B 21/0407* (2013.01); *G08B 21/0446* (2013.01); *G08B 25/016* (2013.01); *G08B 29/186* (2013.01)

(58) Field of Classification Search
CPC ............ G08B 21/0407; G08B 21/0446; G08B 25/016; G08B 29/186
See application file for complete search history.

(56) References Cited

U.S. PATENT DOCUMENTS

| | | | | |
|---|---|---|---|---|
| 4,829,285 | A | 5/1989 | Brand | |
| 9,990,836 | B2 | 6/2018 | Will | |
| 10,424,185 | B2 * | 9/2019 | Cordes | G06N 3/0499 |
| 11,423,754 | B1 | 8/2022 | Jordan, II | |
| 2006/0008058 | A1 | 1/2006 | Dai | |
| 2011/0117878 | A1 * | 5/2011 | Barash | G16H 40/20 340/539.12 |

(Continued)

FOREIGN PATENT DOCUMENTS

| | | |
|---|---|---|
| JP | 2008004084 A | 1/2008 |

*Primary Examiner* — Rufus C Point
(74) *Attorney, Agent, or Firm* — Anthony Curro

(57) ABSTRACT

According to at least one embodiment, a method, a computer system, and a computer program product for notifying emergency personnel is provided. The present invention may include continuously monitoring a dependent using one or more dependent devices wherein the continuous monitoring of the dependent comprises monitoring a location of the dependent or a presence of one or more abnormal conditions; and automatically initiating a dependent alert SOS call to emergency personnel using the dependent devices, wherein the automatically initiating the dependent alert SOS call to the one or more emergency personnel occurs upon receiving a guardian activated SOS signal from one or more guardian devices or upon the presence of the one or more abnormal conditions. Additionally, the present invention may include detecting whether one or more guardian devices initiated the guardian-activated SOS signal and detecting of the presence of the one or more abnormal conditions.

11 Claims, 4 Drawing Sheets

(56) References Cited

U.S. PATENT DOCUMENTS

| | | | | |
|---|---|---|---|---|
| 2012/0157037 | A1* | 6/2012 | Hoffman | G08B 25/016 455/404.2 |
| 2013/0331058 | A1 | 12/2013 | Harvey | |
| 2018/0241489 | A1* | 8/2018 | Daoura | H04L 67/10 |
| 2021/0192919 | A1 | 6/2021 | Hookway | |
| 2021/0398411 | A1 | 12/2021 | Hopkins | |
| 2022/0109983 | A1* | 4/2022 | Barkam | H04W 4/029 |
| 2022/0180725 | A1* | 6/2022 | Arora | G08B 21/18 |
| 2023/0258449 | A1* | 8/2023 | Gamble | G01C 5/06 73/384 |

* cited by examiner

AUTOMATED EMERGENCY DETERMINATION AND RESPONSE

BACKGROUND

The present invention relates generally to the field of personal emergency response systems, in particular, to automated personal emergency response systems and methods for responding to automated personal emergency responses.

Personal emergency response systems involve alarm systems designed to summon emergency personnel, often in the event of a medical emergency. These alarm systems can be activated by a person, oftentimes elderly and/or disabled, triggering a button on a subscriber device. Upon receiving an activated alarm, emergency personnel may proceed to respond to the alarm.

SUMMARY

Embodiments of a method, a computer system, and a computer program product for notifying emergency personnel are described. According to one embodiment of the present invention, a method, computer system, and computer program product for notifying emergency personnel is provided. The present invention may include continuously monitoring a dependent using one or more dependent devices wherein the continuous monitoring of the dependent comprises monitoring a location of the dependent or a presence of one or more abnormal conditions; and automatically initiating a dependent alert SOS call to emergency personnel using the dependent devices, wherein the automatically initiating the dependent alert SOS call to the one or more emergency personnel occurs upon receiving a guardian activated SOS signal from one or more guardian devices or upon the presence of the one or more abnormal conditions. Additionally, the present invention may include detecting whether one or more guardian devices initiated the guardian-activated SOS signal and detecting of the presence of the one or more abnormal conditions.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
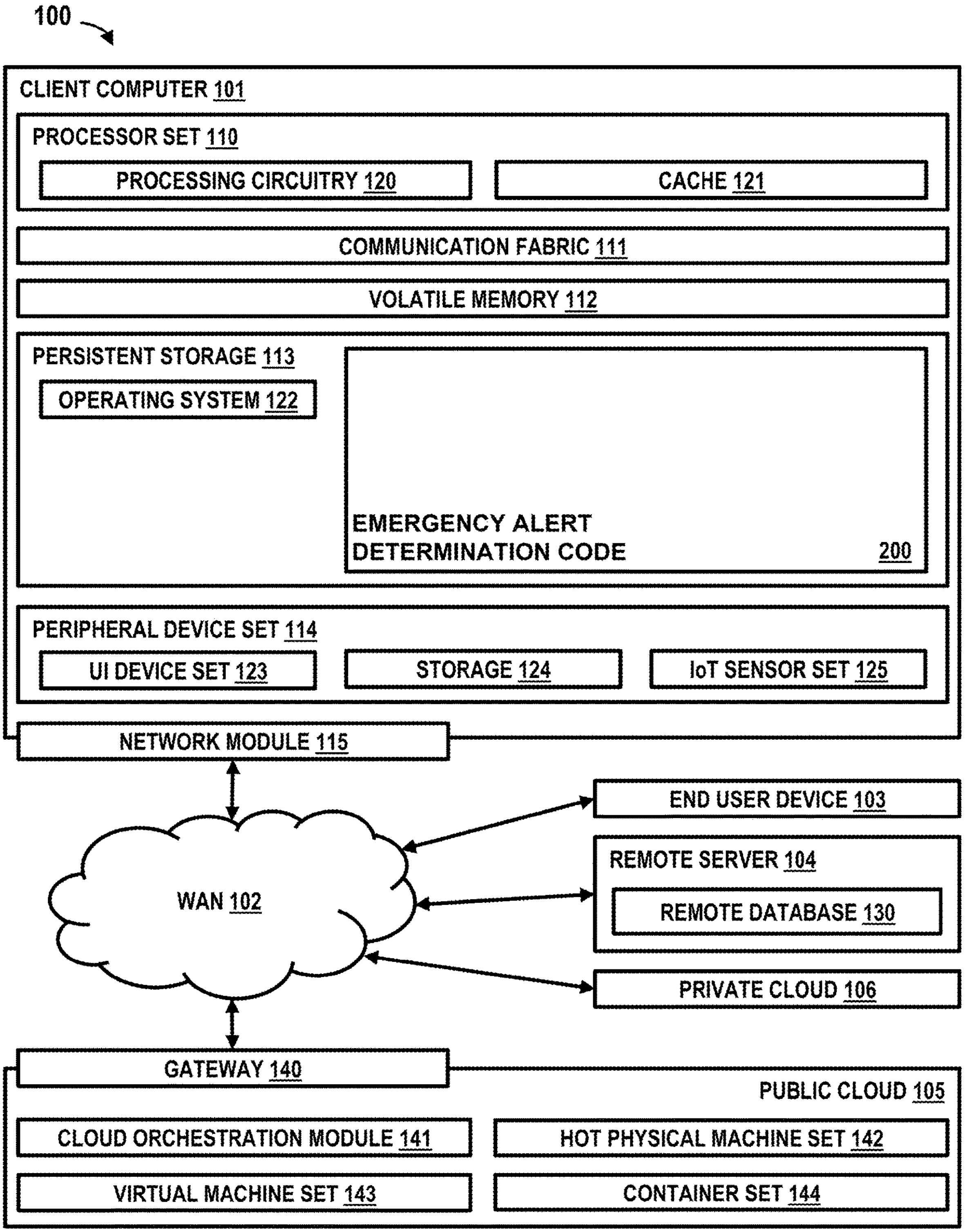
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to the field of personal emergency response systems, and in particular, to automated personal emergency response systems and methods for responding to automated personal emergency responses. The following described exemplary embodiments provide a method, program product, and system to, among other things, automatically call emergency personnel based on the remote activation of an SOS call by a guardian and/or the presence of one or more abnormal conditions in a dependent. Therefore, the present embodiment has the capacity to improve computers and personal emergency response systems by continuously monitoring a dependent, thus, enabling remote activation of an SOS signal to emergency personnel and calls to emergency personnel based on the detection of one or more abnormal conditions using machine learning models.

As previously described, personal emergency response systems involve alarm systems designed to summon emergency personnel, often in the event of a medical emergency. These alarm systems can be activated by a person, oftentimes elderly and/or disabled, triggering a button on a subscriber device. Upon receiving an activated alarm, emergency personnel may proceed to respond to the alarm. However, there can be times when emergency services are required for a person who is unable to trigger the button necessary to activate the alarm system. As a result, emergency personnel will be unaware of an emergency, and thus, no help will be provided to the person in need. As previously stated, current methods attempt to improve personal emergency response systems by using subscriber devices. However, persons need to initiate activation of an emergency by pressing a button on the device to notify emergency personnel. Additionally, current methods attempt to improve personal emergency response systems by measuring the heart rate of a person using a sensor and initiating a call for emergency personnel upon the detection of a signal above a predetermined threshold. However, this method is only capable of initiating an automated call to emergency personnel based on a measured heart rate. Therefore, it may be likely that a person is unable to receive an accelerated response to an emergency because of the inability to automatically send a call for help upon detection of an abnormal condition and thus faces not receiving the proper care that may be required to treat their emergency.

Thus, embodiments of the present invention may provide advantages including, but not limited to, automatically calling emergency personnel on behalf of a dependent who may not be capable of calling for help themselves and initiating an SOS call on behalf of a person who is remotely monitoring the dependent. The present invention does not require that all advantages need to be incorporated into every embodiment of the invention.

According to at least one embodiment, a location of a dependent can be continuously monitored. According to at least one embodiment, a dependent can be monitored for the presence of one or more abnormal conditions. According to at least one embodiment, in response to receiving a guardian-activated SOS signal from a guardian device, one or more emergency services can be called using a device of the dependent. According to at least one embodiment, in response to detecting the presence of one or more abnormal conditions, one or more emergency services can be called using the dependent's device.

According to at least one other embodiment, the location of the dependent can be continuously sent to another device. According to at least one other embodiment, whether the other device initiated an SOS signal can be detected.

According to at least one other embodiment, the presence of one or more abnormal conditions can be detected.

The present invention may be a system, a method, and/or a computer program product at any possible technical detail level of integration. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product for notifying emergency personnel, comprising continuously monitoring a location of a dependent, continuously sending the location of the dependent to another device, detecting whether the other device initiated an SOS signal, and in response to detecting the initiated SOS signal from the other device, calling one or more emergency services using a device of the dependent. Additionally, the following described exemplary embodiments provide a system, method, and program product for notifying emergency personnel, comprising continuously monitoring the dependent to detect one or more abnormal conditions, and in response to detecting the one or more abnormal conditions, calling one or more emergency services using the device of the dependent.

Beginning now with FIG. 1, an exemplary networked computer environment 100 is depicted, according to at least one embodiment. Computing environment 100 contains an example of an environment for the execution of at least some of the computer code involved in performing the inventive methods, such as emergency alert determination code 200, "the program". In addition to code block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer, or any other form of computer or mobile device now known or to be developed in the future that is capable of running an algorithm, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated. Additionally, computer 101 may comprise a dependent device.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200, in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200, typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as application-specific integrated circuits ("ASICs"), copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on. Additionally, EUD 103 may comprise a guardian device.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The database 130 may be a digital repository capable of data storage and data retrieval. The database 130 can be present in the remote server 104 and/or any other location in the network 102. The database 130 can comprise a knowledge corpus. The knowledge corpus may comprise machine learning models. Additionally, the knowledge corpus can comprise training data used to train the machine learning models as well as the data produced by the machine learning models. Also, the database 130 may comprise profiles of dependents. A dependent's profile may comprise personal information, such as a dependent's name, home address, emergency contact(s), preexisting conditions, list of medications the dependent is taking, vitals, hair color, height, age, picture, etc. Additionally, the database 130 may comprise information on emergency services and guardians, such as their location and contact information.

According to the present embodiment, the emergency alert determination code 200, "the program", may be a program capable of continuously monitoring the location of a person being monitored via the dependent device 101, continuously sending the location of the dependent to a guardian device 103, determining whether a guardian-activated SOS signal was initiated by the guardian device 103, sending a remote-activated SOS signal from the guardian device 103 to the dependent's device 101, and upon receiving an SOS signal from guardian device 103, initiating a dependent alert SOS call to emergency personnel. Additionally, the program 200 may be a program capable of monitoring the dependent for detection of an abnormal condition, determining whether an abnormal condition is detected, and sending an SOS signal to emergency personnel upon the detection of an abnormal condition. The program 200 may be located on client computing device 101 or remote server 104, and guardian device 103, or on any other device located within network 102. Furthermore, the program 200 may be distributed in its operation over multiple devices, such as client computing device 101, remote server 104, and guardian device 103. The emergency alert determination method is explained in further detail below with respect to FIG. 2 and FIG. 3.

Figure 2:
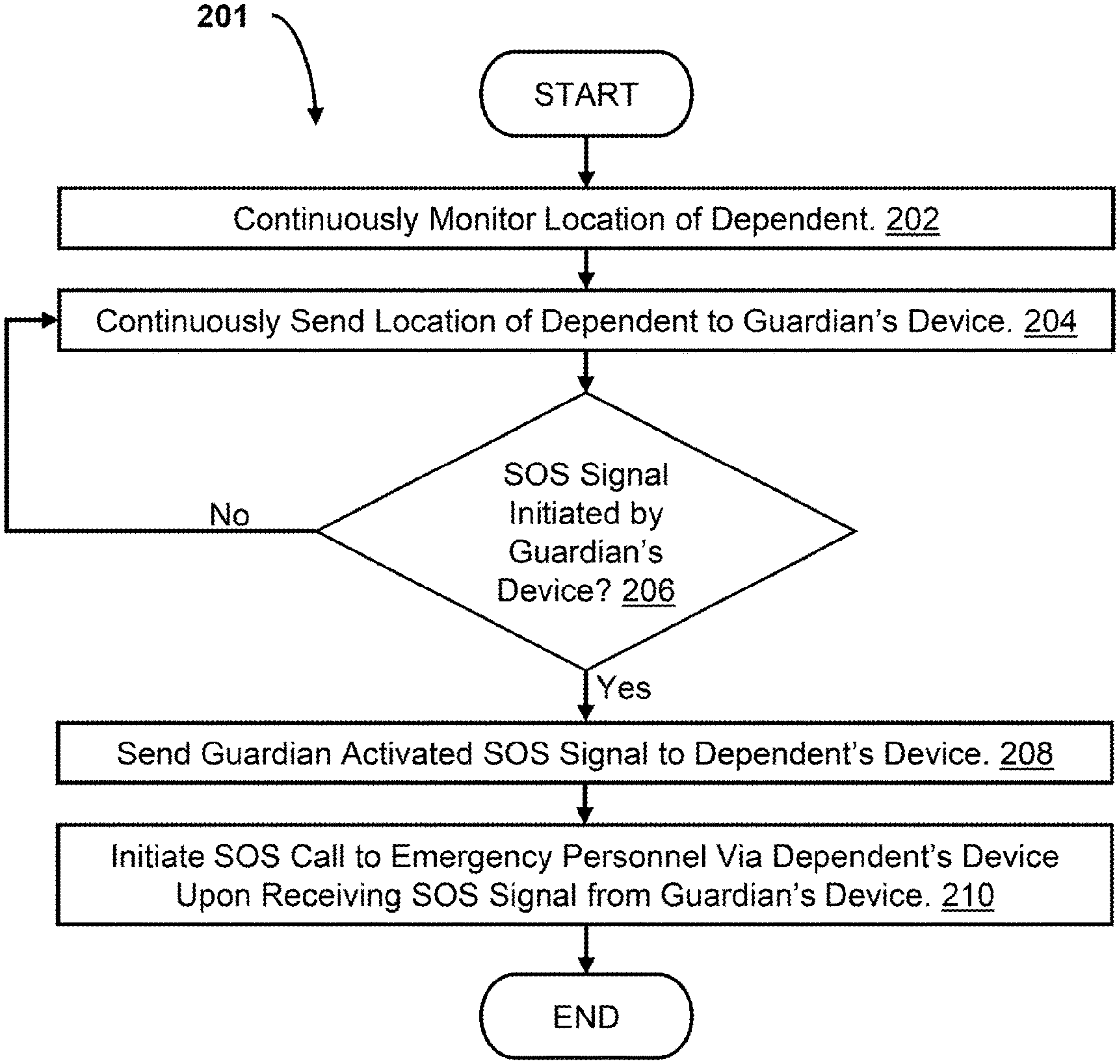
FIG. 2 is an operational flowchart illustrating an emergency alert determination process according to at least one embodiment.

FIG. 2 is an operational flowchart illustrating an emergency alert determination process 201 according to at least one embodiment. At 202, the program 200 continuously monitors the location of a person being monitored ("the dependent") via the dependent device 101. In some embodiments of the invention, the dependent may comprise an animal, such as a dog or cat. A dependent device 101 may be a device comprising GPS capabilities, cellular capabilities, temperature sensing capabilities, and microphone sound detection capabilities, such as a smart phone. Additionally, the dependent device may comprise one or more wearable devices 114, such as a wristband or pendant. The dependent device 101 may collect real-time data on a dependent's location, such as the latitude, longitude, altitude, speed, and direction of the dependent.

At 204, the program 200 continuously sends the location of the dependent to a guardian device 103. A guardian may be a person(s) who has permission to both track the location of the dependent's device 101 and initiate SOS alerts using the guardian device 103. Guardian device(s) 103 may comprise various devices that can run program 200, such as a smart phone, tablet, computer, etc. Also, guardian device 103 may comprise tracking software. The program 200 may grant permission(s) to allow the sharing of data between the guardian device 103 and the dependent device 101, and the ability for the guardian device 103 to initiate an SOS alert for the dependent, via the dependent device 101, upon system admin(s) allowing such permission(s) on the dependent device 101 and the guardian device 103. Dependent device 101 may send data to guardian device 103 using WAN 108 and/or LANs 108. The guardian device 103 may analyze received location data of the dependent to dynamically display the location of the dependent on a map, thus providing real-time tracking information of the dependent.

At 206, the program 200 determines whether a guardian-activated SOS signal was initiated by the guardian device 103. According to one implementation, in response to determining that a guardian-activated SOS signal was initiated by the guardian's device 103 (step 206 "YES" branch), the program 200 may continue to step 208 to send the guardian-activated SOS signal from the guardian device 103 to program 200 on the dependent's device 101. The program 200 may determine that a guardian-activated SOS signal has been initiated based upon the guardian 'clicking' a prompt, such as "activate SOS signal" to activate an SOS signal on the guardian device 103 via the GUI. In response to determining that no guardian-activated SOS signal has been initiated by the guardian device 103 (step 206, "NO" branch), the program 200 may continue to step 204 to continuously send the location of the dependent to the guardian device 103.

At 208, the program 200 sends a guardian-activated SOS signal from the guardian device 103 to the dependent's device 101. The guardian device 103 may send data to dependent device 101 using WAN 108 and/or LAN 108. In some embodiments, the guardian may cancel the guardian-activated SOS signal using a prompt on the GUI of the guardian device 103, such as in a situation where the guardian was informed that the dependent was no longer in need of help.

At 210, upon receiving a guardian-activated SOS signal from guardian device 103, the program 200 initiates a dependent alert SOS call to emergency personnel. The dependent alert SOS call may comprise a phone call and/or text message. The program 200 can initiate a phone call and/or text message to emergency personnel on the dependent's device 101 via the cellular module 402. The program 200 may initiate a dependent alert SOS call to one or more emergency personnel based on the dependent's location, i.e., the program 200 may initiate a call to emergency personnel within a certain set radius based on the dependent's location at the time the guardian-activated SOS signal was sent from the guardian device 103 to the dependent's device 101. The dependent device 101 may communicate with emergency personnel using WAN 108 and/or LAN 108. Emergency personnel can comprise emergency medical personnel, such as law enforcement, medical services, fire services, etc. A dependent alert SOS call can be a pre-recorded automated voice message and/or text message comprising personal information within the dependent's profile, such as their name, home address, emergency contact(s), preexisting conditions, list of medications the dependent is taking, age, height, hair color, etc. A dependent's personal information may be entered into a dependent's profile via the GUI upon the creation of an account on the program 200. In some embodiments, such as when a guardian cancels the guardian-activated SOS signal, the program 200 may end the outgoing dependent alert SOS call.

Figure 3:
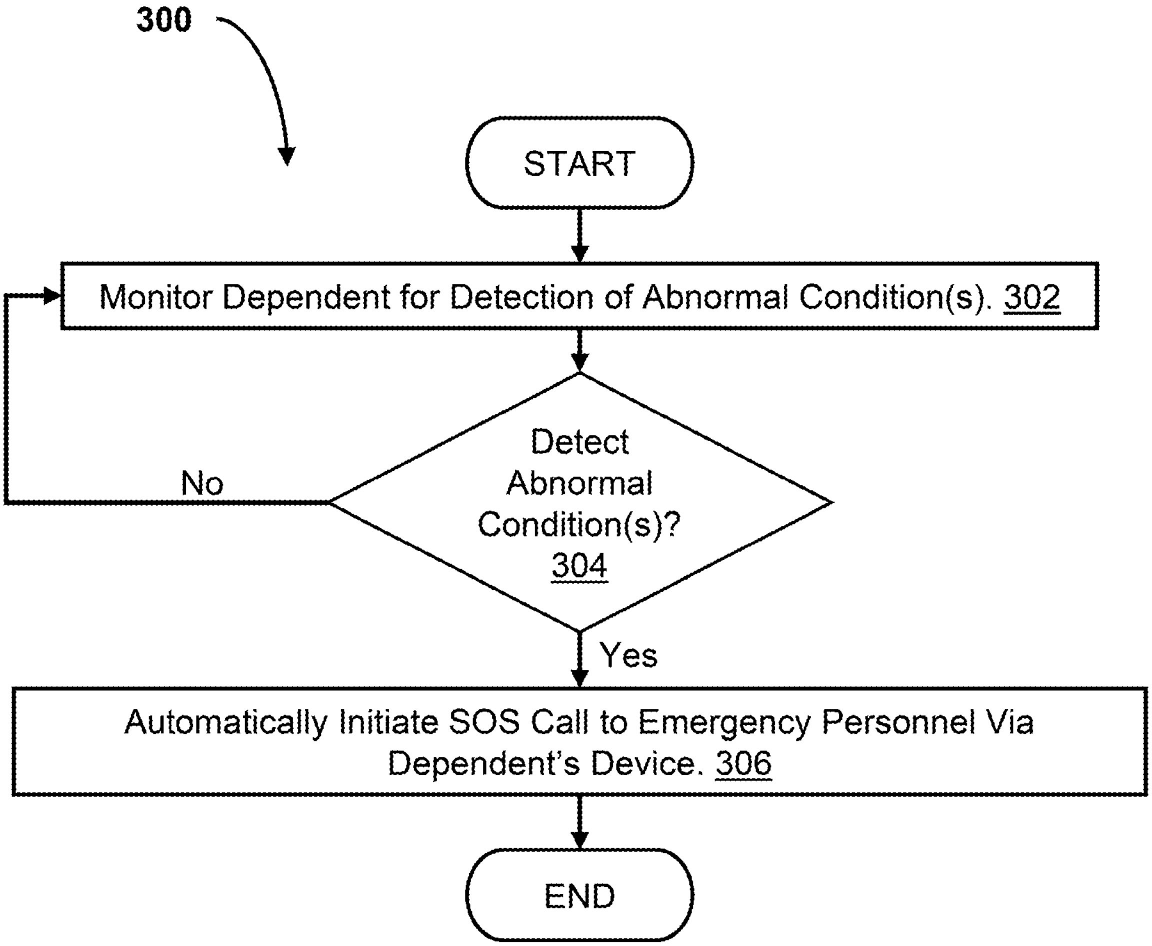
FIG. 3 is an operational flowchart illustrating an abnormal condition emergency alert determination process according to at least one embodiment.

FIG. 3 is an operational flowchart illustrating an abnormal condition emergency alert determination process 300 according to at least one embodiment. At 302, the program 200 monitors the dependent for detection of an abnormal condition. An abnormal condition may comprise the dependent not moving for a certain set period of time, the dependent deviating from a normal walking pattern, for example moving in circles, exposure to a temperature above a certain level for a certain amount of time, exceeding a certain distance from a home base, such as the dependent's house, exposure to voice levels above a certain threshold, such as gunshots or explosions. In addition to real-time data on a dependent's location, dependent device 101 may collect real-time data on a dependent's motion, sounds in the dependent's surrounding environment via the microphone sound detector module 408, and the temperature in the dependent's surrounding environment via the temperature sensing module 406.

At 304, the program 200 determines whether an abnormal condition is detected. According to one implementation, in response to detecting an abnormal condition (step 304, "YES" branch), the program 200 may continue to step 306 to send a dependent alert SOS call to emergency personnel. The program 200 may detect an abnormal condition using machine learning models, such as deep learning algorithms, and more specifically, XGB Binary Models. A separate machine learning model may be trained for the detection of each of the five (5) abnormal conditions. The machine learning models may each be trained using training data that can be uploaded to the program 200. Training data may comprise data used to train the individual machine learning models, such as: (1) temperature data comprising temperature ranges tagged as being too high or low; (2) audio data comprising sound levels tagged as above a certain sound threshold or as a specific type of sound, for example, glass breaking; and (3) location data comprising movement patterns of a dependent as well as location boundaries tagged as dependent's safe zones. Also, the program 200 may analyze the training data, for example, to identify movement patterns/trends of a dependent for the purpose of establishing a normal movement pattern. The program 200 can use the trained machine learning models to process the captured data from the dependent device 101 and to analyze the captured data to determine if one or more abnormal conditions are present in the dependent, based on the output of an abnormal condition trigger from one or more of the trained machine learning models. The machine learning models may output an abnormal condition trigger upon the detection of an abnormal condition, such as when the dependent: (1) has not moved for a certain set period of time; (2) deviated from a normal moving pattern; (3) was exposed to a certain temperature for a certain amount of time; (4) exceeded a certain distance away from a set location; and (5) was exposed to audio levels above a certain threshold, respectively. If no abnormal condition is detected (step 304, "NO" branch), the program 200 may continue to step 302 to continue monitoring the dependent for detection of an abnormal condition. The program 200 may continuously update the machine learning models upon additional collected and analyzed data.

At 306, the program 200 initiates a dependent alert SOS call to emergency personnel upon the detection of an abnormal condition. Upon detection of an abnormal condition, the machine learning model can send a signal to the program 200 to initiate a dependent alert SOS call. The program 200 can call emergency personnel using the dependent's device 101, in the same manner as in step 210. The dependent alert SOS call may comprise the same information as the dependent alert SOS call in step 210.

Figure 4:
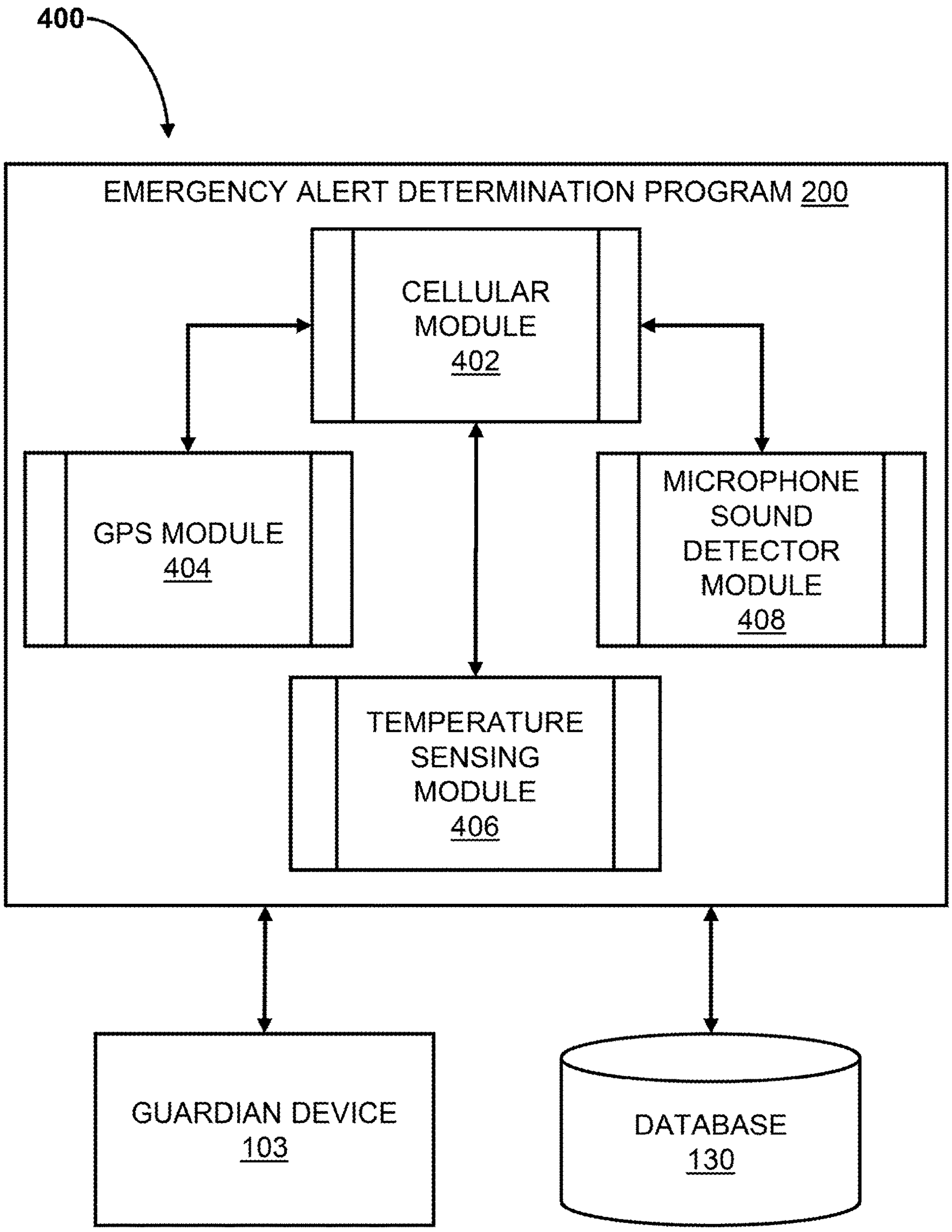
FIG. 4 is a system diagram illustrating an exemplary program environment of an implementation of an emergency alert determination process and an abnormal condition emergency alert determination process according to at least one embodiment.

Referring now to FIG. 4, a system diagram illustrating an exemplary program environment 400 of an implementation of an emergency alert determination process 201 and an abnormal condition emergency alert determination process 300 is depicted according to at least one embodiment. Here, the program 200 comprises a cellular module 402, a GPS module 404, a temperature sensing module 406, and a microphone sound detector module 408. The exemplary program environment 400 details the interactions between the cellular module 402 and the GPS module 404, the cellular module 402 and the temperature sensing module 406, and the cellular module 402 and the microphone sound detector module 408. Additionally, the exemplary program environment 400 details the interactions between the program 200 and the guardian device 103, and the program 200 and the database 130.

The cellular module 402 may be used to enable voice and text communication, and data transmission, and provide cellular network connectivity. The GPS module 404 may be used to determine the location of a dependent device 101 using satellite navigation. The temperature sensing module 406 may be used to measure the temperature of a surrounding environment. The microphone sound detector module 408 may be used to detect and measure sound waves.

It may be appreciated that FIGS. 2 through 4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for notifying emergency personnel using one or more guardian devices and one or more dependent devices acting in tandem, the method comprising:

monitoring, continuously by one or more guardian devices, a location of a dependent and a presence of one or more abnormal conditions associated with the dependent using one or more dependent devices in connection with the guardian device, the one or more guardian devices associated with a guardian who has permission to track a location of the one or more dependent devices and permission to initiate SOS alerts, monitoring continuously the presence of the one or more abnormal conditions in the dependent comprising collecting real-time data on the location of the dependent, motion of the dependent, sounds in a surrounding environment, and temperature in the surrounding environment using the one or more dependent devices, wherein the one or more abnormal conditions are each detected by a separate machine learning model of a plurality of separately trained machine learning models to detect the presence of one of more abnormal conditions in the dependent;

processing the collected real-time data through at least one of the plurality of separately trained machine learning models to detect the presence of the one or more abnormal conditions in the dependent;

receiving, continuously, by the one or more guardian devices the location of the dependent determined from the one or more dependent devices;

upon detecting the presence of at least one of the one or more of the one or more abnormal conditions in the dependent, sending one or more abnormal condition triggers to the one or more dependent devices; and upon the one or more dependent devices receiving at least one out of a guardian-activated SOS signal from one or more guardian devices and one or more abnormal condition triggers, automatically initiating by the one or more dependent device a dependent alert SOS call to one or more emergency personnel via a public cloud.

2. The method of claim 1, wherein the one or more emergency personnel to receive the dependent alert SOS call are chosen based on the location of the dependent at a corresponding time during which the dependent alert SOS call was initiated.

3. The method of claim 1, further comprising:

upon detecting that the one or more guardian devices cancelled the guardian-activated SOS signal, ending the dependent alert SOS call.

4. The method of claim 1, wherein the dependent alert SOS call comprises a pre-recorded voice message and/or a text message, and wherein the pre-recorded voice message and the text message each comprise personal information within a profile of the dependent.

5. A computer system for notifying emergency personnel using one or more guardian devices and one or more dependent devices acting in tandem, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

monitoring, continuously by one or more guardian devices, a location of a dependent and a presence of one or more abnormal conditions associated with the dependent using one or more dependent devices in connection with the guardian device, the one or more guardian devices associated with a guardian who has permission to track a location of the one or more dependent devices and permission to initiate SOS alerts, monitoring continuously the presence of the one or more abnormal conditions in the dependent comprising collecting real-time data on the location of the dependent, motion of the dependent, sounds in a surrounding environment, and temperature in the surrounding environment using the one or more dependent devices, wherein the one or more abnormal conditions are each detected by a separate machine learning model of a plurality of separately trained machine learning models to detect the presence of one of more abnormal conditions in the dependent;

processing the collected real-time data through at least one of the plurality of separately trained machine learning models to detect the presence of the one or more abnormal conditions in the dependent;

receiving, continuously, by the one or more guardian devices the location of the dependent determined from the one or more dependent devices;

upon detecting the presence of at least one of the one or more of the one or more abnormal conditions in the dependent, sending one or more abnormal condition triggers to the one or more dependent devices; and upon the one or more dependent devices receiving at least one out of a guardian-activated SOS signal from one or more guardian devices and one or more abnormal condition triggers, automatically initiating by the one or more dependent device a dependent alert SOS call to one or more emergency personnel via a public cloud.

6. The computer system of claim 5, wherein the one or more emergency personnel to receive the dependent alert SOS call are chosen based on the location of the dependent at a corresponding time during which the dependent alert SOS call was initiated.

7. The computer system of claim 5, further comprising:

upon detecting that the one or more guardian devices cancelled the guardian-activated SOS signal, ending the dependent alert SOS call.

8. The computer system of claim 5, wherein the dependent alert SOS call comprises a pre-recorded voice message and/or a text message, and wherein the pre-recorded voice message and the text message each comprise personal information within a profile of the dependent.

9. A computer program product for notifying emergency personnel using one or more guardian devices and one or more dependent devices acting in tandem, the computer program product comprising:

one or more computer-readable tangible storage medium and program instructions stored on at least one of the one or more tangible storage medium, the program instructions executable by a processor to cause the processor to perform a method comprising:

monitoring, continuously by one or more guardian devices, a location of a dependent and a presence of one or more abnormal conditions associated with the dependent using one or more dependent devices in connection with the guardian device, the one or more guardian devices associated with a guardian who has permission to track a location of the one or more dependent devices and permission to initiate SOS alerts, monitoring continuously the presence of the one or more abnormal conditions in the dependent comprising collecting real-time data on the location of the dependent, motion of the dependent, sounds in a surrounding environment, and temperature in the surrounding environment using the one or more dependent devices, wherein the one or more abnormal conditions are each detected by a separate machine learning model of a plurality of separately trained machine learning models to detect the presence of one of more abnormal conditions in the dependent;

processing the collected real-time data through at least one of the plurality of separately trained machine learning models to detect the presence of the one or more abnormal conditions in the dependent;

upon detecting the presence of at least one of the one or more of the one or more abnormal conditions in the dependent, sending one or more abnormal condition triggers to the one or more dependent devices; and upon the one or more dependent devices receiving at least one out of a guardian-activated SOS signal from one or more guardian devices and one or more abnormal condition triggers, automatically initiating by the one or more dependent device a dependent alert SOS call to one or more emergency personnel via a public cloud.

10. The computer program product of claim 9, wherein the one or more emergency personnel to receive the dependent alert SOS call are chosen based on the location of the dependent at a corresponding time during which the dependent alert SOS call was initiated.

11. The computer program product of claim 9, further comprising:

upon detecting that the one or more guardian devices cancelled the guardian-activated SOS signal, ending the dependent alert SOS call.

* * * * *